(12) United States Patent
Mo et al.

(10) Patent No.: US 12,250,730 B2
(45) Date of Patent: Mar. 11, 2025

(54) RANDOM ACCESS METHOD AND TERMINAL

(71) Applicant: VIVO MOBILE COMMUNICATION CO., LTD., Guangdong (CN)

(72) Inventors: Yitao Mo, Dongguan (CN); Yumin Wu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 469 days.

(21) Appl. No.: 17/382,422

(22) Filed: Jul. 22, 2021

(65) Prior Publication Data

US 2021/0352741 A1 Nov. 11, 2021

Related U.S. Application Data

(63) Continuation of application No. PCT/CN2020/073774, filed on Jan. 22, 2020.

(30) Foreign Application Priority Data

Jan. 25, 2019 (CN) .......................... 201910075298.5

(51) Int. Cl.
*H04W 74/08* (2024.01)
*H04W 72/02* (2009.01)
*H04W 72/0453* (2023.01)
*H04W 72/54* (2023.01)
*H04W 74/0833* (2024.01)

(52) U.S. Cl.
CPC ....... *H04W 74/0841* (2013.01); *H04W 72/02* (2013.01); *H04W 72/0453* (2013.01); *H04W 72/54* (2023.01)

(58) Field of Classification Search
CPC .......................... H04W 71/0841; H04W 72/02
See application file for complete search history.

(56) References Cited

U.S. PATENT DOCUMENTS

| | | | |
|---|---|---|---|
| 10,973,056 B2* | 4/2021 | Jang | H04W 76/28 |
| 11,191,080 B2* | 11/2021 | Agiwal | H04L 5/0094 |
| 2010/0067470 A1 | 3/2010 | Damnjanovic et al. | |
| 2018/0310213 A1 | 10/2018 | Kazmi et al. | |
| 2019/0215749 A1* | 7/2019 | Shih | H04W 36/18 |
| 2020/0170020 A1* | 5/2020 | Agiwal | H04L 5/0055 |
| 2020/0281022 A1* | 9/2020 | Pelletier | H04W 52/367 |
| 2020/0305200 A1* | 9/2020 | Jiang | H04W 72/21 |

(Continued)

FOREIGN PATENT DOCUMENTS

| | | | |
|---|---|---|---|
| CN | 107820719 A | 3/2018 | |
| EP | 3528582 A1 | 8/2019 | |

(Continued)

OTHER PUBLICATIONS

First Office Action regarding Chinese Patent Application No. 201910075298.5, dated Dec. 21, 2021. Translation provided by Bohui Intellectual Property.

(Continued)

*Primary Examiner* — Zhiren Qin
(74) *Attorney, Agent, or Firm* — Harness, Dickey & Pierce, P.L.C.

(57) ABSTRACT

A random access method includes: sending a random access request message through a target carrier. The target carrier is one of a first type of uplink carrier and a second type of uplink carrier.

20 Claims, 4 Drawing Sheets

```
┌──────────────────────────────────────────────────┐
│ Obtain threshold information and channel         │ ─── 31
│ measurement information                          │
└──────────────────────────────────────────────────┘
                         │
                         ▼
┌──────────────────────────────────────────────────┐
│ Select one from the first type of uplink carrier │
│ and the second type of uplink carrier as the     │ ─── 32
│ target carrier according to the threshold        │
│ information and the channel measurement          │
│ information                                      │
└──────────────────────────────────────────────────┘
                         │
                         ▼
┌──────────────────────────────────────────────────┐
│ Send a random access request message through     │ ─── 33
│ the target carrier                               │
└──────────────────────────────────────────────────┘
```

(56) References Cited

U.S. PATENT DOCUMENTS

| | | | |
|---|---|---|---|
| 2020/0396654 A1* | 12/2020 | Freda | H04W 36/06 |
| 2021/0153253 A1* | 5/2021 | Wang | H04W 72/02 |
| 2021/0243677 A1* | 8/2021 | Li | H04L 5/001 |
| 2021/0345332 A1* | 11/2021 | He | H04W 16/14 |

FOREIGN PATENT DOCUMENTS

| | | |
|---|---|---|
| EP | 3716719 A1 | 9/2020 |
| WO | WO-2018171194 A1 | 9/2018 |

OTHER PUBLICATIONS

"Switch between SUL and NUL during ongoing RA procedure," Ericsson, 3GPP TSG-RAN WG2 Meeting #103, Tdoc R2-1811623, Resubmission of R2-1810067, dated Aug. 24, 2018.

Supplementary European Search Report regarding Patent Application No. 20744483.7-1215/3917253; PCT/CN2020/073774, dated Feb. 21, 2022.

"Measurement to select UL Carrier for Random Access, Change Request," Samsung Electronics, 3GPP TSG-RAN2 104, R2-1816310, dated Nov. 16, 2018.

"RACH carrier selection for NR-U," ITL, 3GPP TSG-RAN WG2 Meeting #103bis, R2-1815502, dated Oct. 12, 2018.

"Random Access Fallback to SUL, Change Request," Ericsson, 3GPP TSG-RAN WG2 Meeting NR AdHoc#1801, R2-1800687, dated Jan. 26, 2018.

"Random Access Fallback to SUL," Ericsson, 3GPP TSG-RAN WG2 Nr AH#3, R2-1800686, dated Jan. 26, 2018.

"Draft CR on timer-based active BWP switching, Change Request," Media Tek et al., 3GPP TSG RAN WG1 Meeting #95, R1-1814284, dated Nov. 16, 2018.

"Corrections on PRACH procedure," Samsung, 3GPP TSG RAN WG1 Meeting #92Bis, R1-1804349, dated Apr. 20, 2018.

International Search Report and Written Opinion of the International Searching Authority regarding International Patent Application No. PCT/CN2020/073774, dated Apr. 21, 2020. Translation provided by Bohui Intellectual Property.

"CFRA resources allocation in the cell with UL and SUL," CATT, 3GPP Tsg-Ran WG2#102. R2-1806999, dated May 25, 2018.

"Correction in 38321 for the selection of UL carrier for random access," Huawei et al., 3GPP TSG-RAN WG2 MeetingAH1801, R2-1810006, dated May 25, 2018.

"Considering on the RA triggered BWP switch in case SUL is configured," ZTE et al., 3GPP TSG-RAN WG2 Meeting #103, R2-1811480, dated Aug. 24, 2018.

"CR of NR test case 7.1.1.1.5_SUL," Huawei et al., 3GPP TSG RAN5 Meeting #81, R5-186963, dated Nov. 16, 2018.

* cited by examiner

Send a random access request message through a target carrier; where the target carrier is one of a first type of uplink carrier and a second type of uplink carrier / 21

RANDOM ACCESS METHOD AND TERMINAL

CROSS-REFERENCE TO RELATED APPLICATIONS

This application is a Bypass Continuation Application of PCT/CN2020/073774 filed on Jan. 22, 2020, which claims priority to Chinese Patent Application No. 201910075298.5 filed on Jan. 25, 2019, which are incorporated herein by reference in their entirety.

TECHNICAL FIELD

The present disclosure relates to the field of communications technologies, and in particular, to a random access method and a terminal.

BACKGROUND

In a 5-th generation (5G) mobile communication system, which is also referred to as a new radio (NR) system, to enhance NR uplink coverage and improve spectrum efficiency, a supplement uplink (SUL) carrier is introduced, that is, a serving cell can be configured with both a normal uplink (NUL) carrier and an SUL carrier. Further, in a mobile communication system, an unlicensed band may serve as supplement of a licensed band, to help an operator perform service capacity expansion. Then, when the serving cell is configured with uplink carriers of both the licensed band and the unlicensed band, the uplink carrier of the licensed band can be used as an SUL carrier and the uplink carrier of the unlicensed band can be used as another uplink carrier.

SUMMARY

According to a first aspect, an embodiment of the present disclosure provides a random access method, applied to a terminal side, including:
 sending a random access request message through a target carrier; where the target carrier is one of a first type of uplink carrier and a second type of uplink carrier.

According to a second aspect, an embodiment of the present disclosure further provides a terminal, including:
 a sending module, configured to send a random access request message through a target carrier; where the target carrier is one of a first type of uplink carrier and a second type of uplink carrier.

According to a third aspect, an embodiment of the present disclosure provides a terminal. The terminal includes a processor, a memory, and a computer program stored in the memory and executable on the processor. When the computer program is executed by the processor, the step of the foregoing random access method is implemented.

According to a fourth aspect, an embodiment of the present disclosure provides a non-transitory computer-readable storage medium. The non-transitory computer-readable storage medium stores a computer program, and when the computer program is executed by a processor, the step of the foregoing random access method is implemented.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings.

DETAILED DESCRIPTION OF EMBODIMENTS

Figures 1, 2:
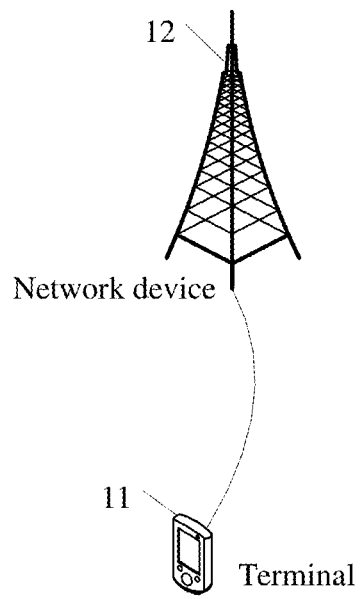
FIG. 1 is a block diagram of a mobile communications system to which an embodiment of the present disclosure can be applied.
FIG. 2 is a schematic flowchart of a random access method according to an embodiment of the present disclosure.

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to enable a more thorough understanding of the present disclosure and to convey the scope of the present disclosure to those skilled in the art.

Terms "first,", "second", or the like in the specification and claims of this application are used to distinguish similar objects, instead of describing a specific sequence or order. It should be understood that the data termed in such a way is interchangeable in proper circumstances so that the embodiments of this application described herein can be implemented in an order other than the order illustrated or described herein. Moreover, the terms "include", "have" and any variants thereof are intended to cover a non-exclusive inclusion. For example, a process, method, system, product, or device that includes a list of steps or units is not necessarily limited to those expressly listed steps or units, but may include other steps or units not expressly listed or inherent to such a process, method, product, or device. "And/or" used in the specification and claims means at least one of the connected objects.

The technology described herein is not limited to a long time evolution (LTE)/LTE-Advanced (LTE-A) system, and can also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. The functions and arrangements of the elements under discussion may be changed without departing from the spirit and scope of the present disclosure. In various examples, various procedures or components may be omitted, replaced, or added appropriately. For example, the described method may be performed in an order different from that described, and steps may be added, omitted, or combined. In addition, features described with reference to some examples may be combined in other examples.

When the serving cell is configured with only one uplink carrier, the terminal can perform a random access process through the uplink carrier, for example, send a random access request message through the uplink carrier, to initiate random access. However, when the serving cell is configured with both an SUL carrier and an NUL carrier, if a network device does not explicitly indicate a carrier used by the terminal for the random access process, the terminal cannot determine a carrier used for the random access process. Furthermore, when band types of multiple uplink carriers are different, because an uplink carrier in the unlicensed band may exist, the terminal cannot determine a carrier used for the random access process. If an improper carrier is used, the random access process may fail.

Referring to FIG. 1, FIG. 1 is a block diagram of a wireless communications system to which an embodiment of the present disclosure can be applied. The wireless communications system includes a terminal 11 and a network device 12. The terminal 11 may be also referred to as a terminal device or a user equipment (UE). The terminal 11 may be a terminal-side device such as a mobile phone, a tablet personal computer, a laptop computer, a personal digital assistant (PDA), a mobile Internet device (MID), a wearable device, or a vehicle-mounted device. It should be noted that a specific type of the terminal 11 is not limited in the embodiments of the present disclosure. The network device 12 may be a base station or a core network. The base station may be a base station of 5G and later releases (for example, a gNB and a 5G NR NB), or a base station in other communications systems (for example, an eNB, a WLAN access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, or another appropriate term in the art. Provided that the same technical effects are achieved, the base station is not limited to specific technical vocabulary. It should be noted that in embodiments of the present disclosure, the base station in the NR system is merely used as an example, but does not limit a specific type of the base station.

The base station can communicate with the terminal 11 under the control of a base station controller. In various examples, the base station controller may be a part of the core network or some base stations. Some base stations can exchange control information or user data with the core network through backhaul. In some examples, some of these base stations may communicate directly or indirectly with each other through a backhaul link, and the backhaul link may be a wired or wireless communication link. The wireless communications system can support operations on multiple carriers (waveform signals of different frequencies). A multi-carrier transmitter can simultaneously transmit a modulated signal on the multiple carriers. For example, each communication link may be a multi-carrier signal modulated based on various radio technologies. Each modulated signal can be sent over different carriers and can carry control information (for example, a reference signal or a control channel), overhead information, data, and the like.

The base station can communicate wirelessly with the terminal 11 via one or more access point antennas. Each base station may provide communication coverage for a corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

Communications links in a wireless communication system may include an uplink for carrying an uplink (UL) transmission (for example, a transmission from the terminal 11 to the network device 12), or a downlink for carrying a downlink (DL) transmission (for example, a transmission from the network device 12 to the terminal 11). The UL transmission may also be referred to as reverse link transmission, and the DL transmission may also be referred to as forward link transmission. The downlink transmission may be performed over a licensed band, an unlicensed band, or the both. Similarly, the uplink transmission may be performed in a licensed band, an unlicensed band, or both.

An embodiment of the present disclosure provides a random access method, applied to a terminal. As shown in FIG. 2, the method includes the following steps:

Step 21: Send a random access request message through a target carrier; where the target carrier is one of a first type of uplink carrier and a second type of uplink carrier.

The target carrier in the embodiments of the present disclosure may be a carrier initially selected by the terminal from the first type of uplink carrier and the second type of uplink carrier according to a preset selection rule. The target carrier further may be the other carrier of the first type of uplink carrier and the second type of uplink carrier to which the terminal changes from one carrier of the first type of uplink carrier and the second type of uplink carrier according to a preset change rule.

The first type of uplink carrier and the second type of uplink carrier can be carriers working in an unlicensed band or carriers working in a licensed band. In addition, frequencies of the first type of uplink carrier and the second type of uplink carriers are also different. Optionally, the frequency of the first type of uplink carrier is higher than the frequency of the second type of uplink carrier. For example, the first type of uplink carrier can be a NUL carrier, and the second type of uplink carrier may be a SUL carrier. Optionally, in the embodiments of the present disclosure, the first type of uplink carrier may be an uplink carrier working in an unlicensed band, and the second type of uplink carrier may be an SUL carrier. Alternatively, the first type of uplink carrier and the second type of uplink carrier are both uplink carriers working in an unlicensed band, and the frequency of the first type of the uplink carrier is higher than the frequency of the second type of uplink carrier. Alternatively, the first type of uplink carrier is an NUL carrier, the second type of uplink carrier is an uplink carrier working in an unlicensed band, and the frequency of the NUL carrier is higher than the frequency of the second type of uplink carrier.

Optionally, the random access request message mentioned in the embodiment of the present disclosure can be message 1 (Msg1) in a 4-step random access process, or can be Msg1 or message A (MsgA) in a 2-step random access process.

The following embodiments of the present disclosure combine two scenarios of initially selecting the target carrier and changing the target carrier, and respectively introduce the random access method of the embodiments of the present disclosure.

Scenario 1: The terminal initially selects the target carrier.

Figure 3:
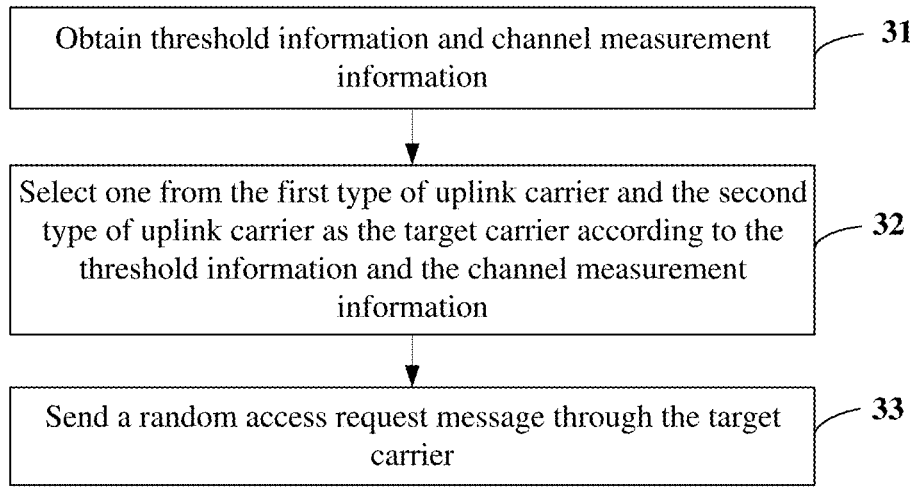
FIG. 3 is a schematic flowchart of a random access method in a first scenario according to an embodiment of the present disclosure.

As shown in FIG. 3, the random access method includes the following steps:

Step 31: Obtain threshold information and channel measurement information.

The threshold information is used to indicate thresholds corresponding to different parameter items. The channel measurement information includes: at least one of first channel measurement information related to the first type of uplink carrier and second channel measurement information related to the second type of uplink carrier.

Optionally, the threshold information and the channel measurement information can be obtained through different methods or different processes. For example, the threshold information is obtained through a system message broadcast by a network device, and the channel measurement information is obtained by the terminal through measurement according to a measurement configuration. Optionally, step 31 can be implemented through the following steps: receiving the system message broadcast by the network device, where the system message carries the threshold information; and obtaining a measurement configuration of at least one of the first type of uplink carrier and the second type of uplink carrier; and measuring at least one of the first type of uplink carrier and the second type of uplink carrier according to the measurement configuration, to obtain the corresponding channel measurement information. The measurement configuration can be predefined, for example, specified in a protocol, and can also be configured by a network device, for example, configured by the network device through radio resource control (RRC) signaling. It is worth pointing out that the process of obtaining the threshold information and the process of obtaining the channel measurement information are not strictly sequentially limited. The threshold information can be first obtained and then the channel measurement information is obtained, or the channel measurement information can be first obtained and then the threshold information is obtained, or the channel measurement information and the threshold information can also be obtained at the same time.

Step 32: Select one from the first type of uplink carrier and the second type of uplink carrier as the target carrier according to the threshold information and the channel measurement information.

The channel measurement information herein may include: first channel measurement information related to the first type of uplink carrier and second channel measurement information related to the second type of uplink carrier.

Correspondingly, the terminal can flexibly select the target carrier according to a channel condition of the first type of uplink carrier or a channel condition of the second type of uplink carrier.

Step 33: Send a random access request message through the target carrier.

The random access request message mentioned herein can be Msg1 in the 4-step random access process, or Msg1 or MsgA in the 2-step random access process.

Optionally, step 32 can be implemented in the following manner: when the threshold information and the channel measurement information satisfy a first preset condition, determining the second type of uplink carrier as the target carrier; where the first preset condition includes at least one of:

channel quality indicated by quality parameter information of a path loss reference signal of a target downlink carrier is less than a first threshold, where the target downlink carrier corresponds to the first type of uplink carrier, or the target downlink carrier corresponds to the second type of uplink carrier. The quality parameter information includes: at least one of reference signal received power (RSRP), reference signal received quality (RSRQ), a received signal strength indicator (RSSI), or a signal to interference plus noise ratio (SINK).

A parameter item in the first channel measurement information is greater than or equal to a second threshold; and a parameter item in the second channel measurement information is less than a third threshold.

Parameter items in the first channel measurement information and the second channel measurement information include: at least one of RSRQ, RSSI, a channel busy ratio (CBR), or a channel occupancy ratio (CR).

That is, when the threshold information and the channel measurement information meet at least one of the above conditions, the second type of uplink carrier can be determined as the target carrier. In addition, when the threshold information and the channel measurement information do not meet the first preset condition, the first type of uplink carrier can be determined as the target carrier.

In the following embodiments of the present disclosure, an example in which the first type of uplink carrier is an uplink carrier working in an unlicensed band, and the second type of uplink carrier is an SUL carrier is used for illustrative description. A serving cell is configured with at least one uplink carrier working in an unlicensed band and one SUL carrier working in a licensed band. The frequency of the SUL carrier is lower than the frequency of the uplink carrier of the unlicensed band. The random access process initiated by the terminal may be contention-based 4-step random access process (4-step RACH), or contention-based 2-step random access process (2-step RACH), or further may be non-contention-based random access process. The network device does not explicitly notify the terminal which uplink carrier of the serving cell is used to perform random access. In this case, the terminal needs to select the target carrier according to step 32. The following uses a specific example to illustrate a specific implementation of step 32.

If the terminal determines that at least one of the following conditions is met: the measured RSRP of the path loss reference signal of the target downlink carrier is less than a first threshold, a channel occupancy ratio of the first type of uplink carrier (the uplink carrier working in the unlicensed band) is greater than or equal to a second threshold, or a channel occupancy ratio of the second type of uplink carrier (an SUL carrier) is less than a third threshold; the terminal selects the SUL carrier for the random access process.

The condition includes but is not limited to one of:
the RSRP of the path loss reference signal measured by the terminal is less than the first threshold;
a channel occupancy ratio of the first type of uplink carrier (the uplink carrier working in an unlicensed band) is greater than or equal to the second threshold;
a channel occupancy ratio of the SUL carrier is less than the third threshold;
the RSRP of the path loss reference signal measured by the terminal is less than the first threshold, and the channel occupancy ratio of the first type of uplink carrier (the uplink carrier working in an unlicensed band) is greater than or equal to the second threshold;
the RSRP of the path loss reference signal measured by the terminal is less than the first threshold, and the channel occupancy ratio of the SUL carrier is less than the third threshold;
the RSRP of the path loss reference signal measured by the terminal is less than the first threshold, and the channel occupancy ratio of the first type of uplink carrier (the uplink carrier working in an unlicensed band) is greater than or equal to the second threshold, and the channel occupancy ratio of the SUL carrier is less than the third threshold; and
the channel occupancy ratio of the first type of uplink carrier (the uplink carrier working in an unlicensed band) is greater than or equal to the second threshold, and the channel occupancy ratio of the SUL carrier is less than the third threshold.

Alternatively, if the terminal determines that at least one of the following conditions is met: the measured RSRP of the path loss reference signal is less than a first threshold, a channel busy ratio of the first type of uplink carrier (the uplink carrier working in the unlicensed band) is greater than or equal to a second threshold, or a channel busy ratio of the second type of uplink carrier (an SUL carrier) is less than a third threshold; the terminal selects the SUL carrier for the random access process.

The condition includes but is not limited to one of:
the RSRP of the path loss reference signal measured by the terminal is less than the first threshold;
a channel busy ratio of the first type of uplink carrier (the uplink carrier working in an unlicensed band) is greater than or equal to the second threshold;
a channel busy ratio of the SUL carrier is less than the third threshold;
the RSRP of the path loss reference signal measured by the terminal is less than the first threshold, and the channel busy ratio of the first type of uplink carrier (the uplink carrier working in an unlicensed band) is greater than or equal to the second threshold;
the RSRP of the path loss reference signal measured by the terminal is less than the first threshold, and the channel busy ratio of the SUL carrier is less than the third threshold;
the RSRP of the path loss reference signal measured by the terminal is less than the first threshold, and the channel busy ratio of the first type of uplink carrier (the uplink carrier working in an unlicensed band) is greater than or equal to the second threshold, and the channel busy ratio of the SUL carrier is less than the third threshold; and
the channel busy ratio of the first type of uplink carrier (the uplink carrier working in an unlicensed band) is greater than or equal to the second threshold, and the channel occupancy ratio of the SUL carrier is less than the third threshold.

In the embodiments of the present disclosure, only an example in which the quality parameter is RSRP is used for description, and for conditions under which the quality parameter is any combination of RSRP, RSRQ, RSSI, and SINR, refer to the above examples, which are not listed herein one by one. Correspondingly, for the parameter item in the channel measurement information, this embodiment also only uses CBR and CR as an example for description. For conditions under which the parameter item in the channel measurement information is any combination of RSRQ, RSSI, CBR, and CR, also refer to the above examples, which are not listed again one by one. In addition, it is worth pointing out that specific values of the first threshold, the second threshold, and the third threshold are not specifically limited in the embodiments of the present disclosure, and those skilled in the art can set the values based on actual conditions.

In the random access method of this scenario, the terminal can select the target carrier from the first type of uplink carrier and the second type of uplink carrier according to the threshold information and the channel measurement information, which can improve flexibility of selecting the random access resource.

The above describes the scenario of initially selecting the target carrier, and the following explains the scenario of changing the target carrier with reference to the accompanying drawings and examples.

Scenario 2: Change the target carrier.

Figure 4:
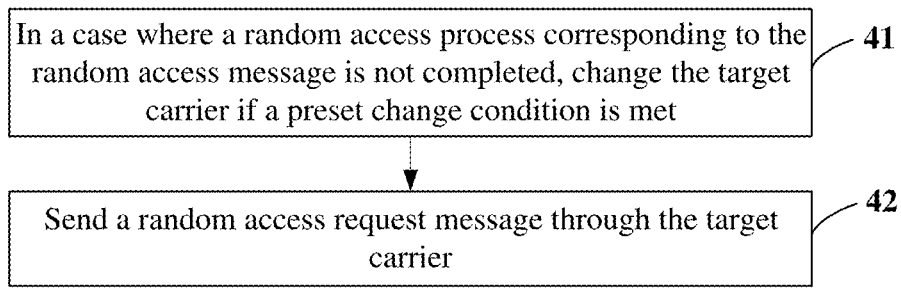
FIG. 4 is a schematic flowchart of a random access method in a second scenario according to an embodiment of the present disclosure.

As shown in FIG. 4, the random access method includes the following steps:

Step 41: In a case where a random access process corresponding to the random access message is not completed, change the target carrier if a preset change condition is met.

That the random access process is not completed mentioned herein can be: the terminal triggers the random access process, but the random access is not completed. In the embodiments of the present disclosure, the preset change condition is related to channel quality, that is, when the terminal determines that the channel quality of the current target carrier is poor, the target carrier can be changed. For example, the target carrier can be changed from the first type of uplink carrier to the second type of uplink carrier; or the target carrier can be changed from the second type of uplink carrier to the first type of uplink carrier.

Step 42: Send a random access request message through the target carrier.

The random access request message is sent through the changed target carrier, so that the success rate of the random access can be improved, and the random access delay can be reduced. The random access request message mentioned herein can be Msg1 in the 4-step random access process, or Msg1 or MsgA in the 2-step random access process.

In the embodiments of the present disclosure, an example in which the current target carrier is the first type of uplink carrier is used for illustrative description. That is, in a case where the target carrier is the first type of uplink carrier, step 41 can be implemented in but is not limited to the following manner: if the preset change condition is met, changing the target carrier from the first type of uplink carrier to the second type of uplink carrier. The preset change condition includes at least one of: a timer corresponding to the random access process expires; a counter corresponding to the random access process is equal to a fourth threshold. a parameter item in the first channel measurement information related to the first type of uplink carrier is greater than or equal to a second threshold; or a parameter item in the second channel measurement information related to the second type of uplink carrier is less than a third threshold.

For example, the preset change condition includes but is not limited to one of:

1. a timer corresponding to the random access process expires.

In a case where the target carrier is the first type of uplink carrier, if the timer corresponding to the random access process expires, the target carrier is changed from the first type of uplink carrier to the second type of uplink carrier. Optionally, before the step of changing the target carrier from the first type of uplink carrier to the second type of uplink carrier if the timer corresponding to the random access process expires, the method further includes: after completing initial selection of the target carrier or completing previous change of the target carrier, starting the timer corresponding to the random access process.

For example, the first type of uplink carrier is the uplink carrier working in the unlicensed band, and the second type of uplink carrier is the SUL carrier. In the implementation of the random access, after the terminal selects the uplink carrier in the unlicensed band during random access initialization, the terminal starts a timer, and if the random access process is not completed and the timer expires, the terminal changes/switches the target carrier to SUL carrier and then performs next random access attempt. For example, a serving cell is configured with at least one uplink carrier working in an unlicensed band and one SUL carrier working in a licensed band or in an unlicensed band. The random access process initiated by the terminal may be contention-based 4-step random access process or contention-based 2-step random access process, or further may be non-contention-based random access process. If the terminal selects the uplink carrier in the unlicensed band for the random access process, the terminal starts a first timer. If the random process is not completed and the first timer expires, the terminal switches to the SUL carrier to perform a (subsequent) random access process. $P_{CMAX}$ configured by the network device is equal to $P_{CMAX,f,c}$ of the SUL carrier. A start time of the first timer can be configured on a network device side through a broadcast message.

2. a counter corresponding to the random access process is equal to a fourth threshold.

In a case where the target carrier is the first type of uplink carrier, if the counter corresponding to the random access process is equal to the fourth threshold, the target carrier is changed from the first type of uplink carrier to the second type of uplink carrier. Optionally, before the step of changing the target carrier from the first type of uplink carrier to the second type of uplink carrier if the counter corresponding to the random access process is equal to the fourth threshold, the method further includes: after completing initial selection of the target carrier or completing previous change of the target carrier, setting the counter corresponding to the random access process; and setting the counter includes initializing the counter or resetting the counter. For example, after completing initial selection of the target carrier, the counter corresponding to the random access process is initialized; and after completing previous change of the target carrier, the counter corresponding to the random access process is reset.

For example, the first type of uplink carrier is the uplink carrier in the unlicensed band, and the second type of uplink carrier is the SUL carrier. In the implementation of the random access, after the terminal selects the uplink carrier in the unlicensed band during random access initialization, if the random access process is not completed and a counter at the medium access control (MAC) layer of the terminal is equal to the fourth threshold, the terminal changes/switches the target carrier to SUL carrier and then performs next random access attempt. For example, a serving cell is configured with at least one uplink carrier working in an unlicensed band and one SUL carrier working in a licensed band or an unlicensed band. The random access process initiated by the terminal may be contention-based 4-step random access process, or contention-based 2-step random access process, or further may be non-contention-based random access process. If the terminal selects the uplink carrier in the unlicensed band for the random access process, the terminal sets a first counter. If the random process is not completed, and the terminal selects the uplink carrier in the unlicensed band to continue the random access process and the first counter is equal to the fourth threshold, the terminal switches to the SUL carrier to perform a (subsequent) random access process. $P_{CMAX}$ configured by the network device is equal to $P_{CMAX,f,c}$ of the SUL carrier. The fourth threshold corresponding to the counter can be configured on the network device side through a broadcast message.

3. a parameter item in the first channel measurement information related to the first type of uplink carrier is greater than or equal to a second threshold.

4. a parameter item in the second channel measurement information related to the second type of uplink carrier is less than a third threshold.

Before step 41, the method further includes: obtaining threshold information and channel measurement information; where the channel measurement information includes: at least one of the first channel measurement information and the second channel measurement information. The threshold information includes but is not limited to: a threshold corresponding to each parameter item in the channel measurement information, such as the first threshold, the second threshold, the third threshold, and the fourth threshold. Optionally, the threshold information and the channel measurement information can be obtained through different methods or different processes. For example, the threshold information is obtained through a system message broadcast by a network device, and the channel measurement information is obtained by the terminal through measurement according to a measurement configuration. It is worth pointing out that the process of obtaining the threshold information and the process of obtaining the channel measurement information are not strictly sequentially limited. The threshold information can be first obtained and then the channel measurement information is obtained, or the channel measurement information can be first obtained and then the threshold information is obtained, or the channel measurement information and the threshold information can also be obtained at the same time.

Optionally, the parameter item in the channel measurement information includes: at least one of RSRQ, a RSSI, a CBR, or a CR. For the parameter item in the channel measurement information, the preset change condition in this embodiment may be conditions of any combination of RSRQ, RSSI, CBR, and CR in the channel measurement information and corresponding thresholds. In addition, it is worth pointing out that specific values of the first threshold, the second threshold, and the third threshold are not specifically limited in the embodiments of the present disclosure, and those skilled in the art can set the values based on actual conditions.

The above 1 to 4 are examples in which the preset change condition is a single condition, and the following 5 to 15 are examples in which the preset condition is a combined condition:

5. if the timer corresponding to the random access process expires, and a counter corresponding to the random access process is equal to a fourth threshold.

6. if the timer corresponding to the random access process expires, and a parameter item in the first channel measurement information related to the first type of uplink carrier is greater than or equal to a second threshold.

7. if the timer corresponding to the random access process expires, and a parameter item in the second channel measurement information related to the second type of uplink carrier is less than a third threshold.

8. if the timer corresponding to the random access process expires, a counter corresponding to the random access process is equal to a fourth threshold, and a parameter item in the first channel measurement information related to the first type of uplink carrier is greater than or equal to a second threshold.

9. if the timer corresponding to the random access process expires, a counter corresponding to the random access process is equal to a fourth threshold, and a parameter item in the second channel measurement information related to the second type of uplink carrier is less than a third threshold.

10. if the timer corresponding to the random access process expires, a parameter item in the first channel measurement information related to the first type of uplink carrier is greater than or equal to a second threshold, and a parameter item in the second channel measurement information related to the second type of uplink carrier is less than a third threshold.

11. a timer corresponding to the random access process expires; a counter corresponding to the random access process is equal to a fourth threshold. a parameter item in the first channel measurement information related to the first type of uplink carrier is greater than or equal to a second threshold; and a parameter item in the second channel measurement information related to the second type of uplink carrier is less than a third threshold.

12. a counter corresponding to the random access process is equal to a fourth threshold, and a parameter item in the first channel measurement information related to the first type of uplink carrier is greater than or equal to a second threshold.

13. a counter corresponding to the random access process is equal to a fourth threshold, and a parameter item in the second channel measurement information related to the second type of uplink carrier is less than a third threshold.

14. a counter corresponding to the random access process is equal to a fourth threshold. a parameter item in the first channel measurement information related to the first type of uplink carrier is greater than or equal to a second threshold; and a parameter item in the second channel measurement information related to the second type of uplink carrier is less than a third threshold.

15. a parameter item in the first channel measurement information related to the first type of uplink carrier is greater than or equal to a second threshold; and a parameter item in the second channel measurement information related to the second type of uplink carrier is less than a third threshold.

Optionally, it is worth pointing out that the counter in the embodiments of the present disclosure is configured to record at least one of:

sending times of the random access request message in the random access process, where the random access request message includes but is not limited to Msg1 or MsgA, Msg1 or MsgA carries a preamble, and the counter is configured to record the number of times Msg1 is sent or record the number of times MsgA is sent, for example, the counter can be a preamble transmission counter or an MsgA transmission counter;

times of power ramping in the random access process, for example, the counter can be a power ramping counter; or times of channel listening failures in the random access process, for example, the counter can be a listen before talk failure counter (LBT failure counter).

In this scenario, the terminal can change the target carrier when the random access is not completed, to increase the success rate of the random access, and reduce the random access delay.

It is worth pointing out that the above implementations of scenario 1 and scenario 2 can be implemented separately or in combination with each other, and the embodiments of the present disclosure do not specifically limit this. In addition, in the embodiments of the present disclosure, scenario 1 and scenario 2 are described by using only an example in which the first type of uplink carrier can be the uplink carrier working on the unlicensed band, and the second type of uplink carrier can be the SUL carrier. The first type of uplink carrier and the second type of uplink carrier are both uplink carriers working in the unlicensed band, and the frequency of the first type of uplink carrier is higher than the frequency of the second type of uplink carrier, or the first type of uplink carrier is the NUL carrier and the second type of uplink carrier is the uplink carrier working in the unlicensed band, and the frequency of the NUL carrier is higher than the frequency of the second type of uplink carrier. Both can be implemented through the implementation of the above scenario 1 and scenario 2.

In the random access method of the embodiments of the present disclosure, the terminal can select a carrier from the first type of uplink carrier and the second type of uplink carrier, which can increase flexibility of selecting a random access resource. In addition, the terminal further can change a target carrier when random access is not completed. This improves a success rate of random access and reduces a random access delay.

The random access methods in different scenarios are separately described in detail in the foregoing embodiment. A terminal corresponding to the method is described in the following embodiment with reference to the accompanying drawings.

Figure 5:
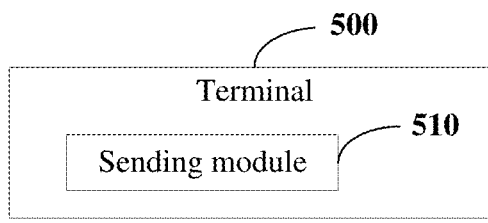
FIG. 5 is a first schematic structural diagram of modules of a terminal according to an embodiment of the present disclosure.

As shown in FIG. 5, a terminal 500 in an embodiment of this disclosure can implement details of the method in the foregoing embodiments: sending a random access request message through a target carrier; where the target carrier is one of a first type of uplink carrier and a second type of uplink carrier. The same effect can be achieved. The terminal 500 includes the following functional modules:

a sending module 510, configured to send a random access request message through a target carrier; where the target carrier is one of a first type of uplink carrier and a second type of uplink carrier.

Figure 6:
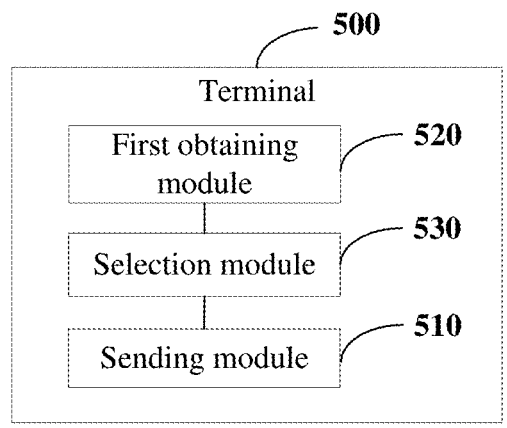
FIG. 6 is a second schematic structural diagram of modules of a terminal according to an embodiment of the present disclosure.

As shown in FIG. 6, the terminal 500 further includes:

a first obtaining module 520, configured to obtain threshold information and channel measurement information; where the channel measurement information includes: at least one of first channel measurement information related to the first type of uplink carrier and second channel measurement information related to the second type of uplink carrier; and a selection module 530, configured to select one from the first type of uplink carrier and the second type of uplink carrier as the target carrier according to the threshold information and the channel measurement information.

The selection module includes:

a first selection submodule, configured to: when the threshold information and the channel measurement information satisfy a first preset condition, determine the second type of uplink carrier as the target carrier; where the first preset condition includes at least one of:

channel quality indicated by quality parameter information of a path loss reference signal of a target downlink carrier is less than a first threshold, where the target downlink carrier corresponds to the first type of uplink carrier, or the target downlink carrier corresponds to the second type of uplink carrier;

a parameter item in the first channel measurement information is greater than or equal to a second threshold; or a parameter item in the second channel measurement information is less than a third threshold.

The quality parameter information includes: at least one of RSRP, RSRQ, a RSSI, or a SINR.

Figure 7:
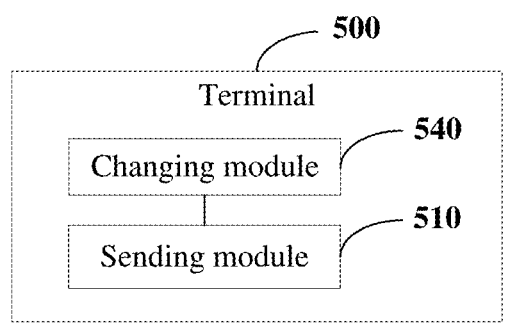
FIG. 7 is a third schematic structural diagram of modules of a terminal according to an embodiment of the present disclosure.

As shown in FIG. 7, the terminal 500 further includes:

a changing module 540, configured to: in a case where a random access process corresponding to the random access message is not completed, change the target carrier if a preset change condition is met.

The changing module 540 includes:

a changing submodule, configured to: in a case where the target carrier is the first type of uplink carrier, if the preset change condition is met, change the target carrier from the first type of uplink carrier to the second type of uplink carrier; where the preset change condition includes at least one of:

a timer corresponding to the random access process expires;

a parameter item in the first channel measurement information related to the first type of uplink carrier is greater than or equal to a second threshold;

a parameter item in the second channel measurement information related to the second type of uplink carrier is less than a third threshold; or a counter corresponding to the random access process is equal to a fourth threshold.

The terminal 500 further includes:

a start module, configured to: after completing initial selection of the target carrier or completing previous change of the target carrier, start the timer corresponding to the random access process;

a setting module, configured to: after completing initial selection of the target carrier or completing previous change of the target carrier, set the counter corresponding to the random access process; and a second obtaining module, configured to obtain threshold information and channel measurement information; where the channel measurement information includes: at least one of the first channel measurement information and the second channel measurement information.

The counter is configured to record at least one of:

sending times of the random access request message in the random access process;

times of power ramping in the random access process; or times channel listening failures in the random access process.

The parameter item includes: at least one of RSRQ, a RSSI, a CBR, or a CR.

The first type of uplink carrier is a NUL carrier, and the second type of uplink carrier is a SUL carrier.

It is worth pointing out that the terminal of the embodiments of the present disclosure can select a carrier from the first type of uplink carrier and the second type of uplink carrier, which can increase flexibility of selecting a resource for the random access request message. In addition, the terminal further can change a target carrier when random access is not completed. This improves a success rate of random access and reduces a random access delay.

It should be noted that, division of the modules of the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementation of other modules are similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or indications in the form of software.

For example, the above modules can be configured into one or more integrated circuits to perform the above methods, such as: one or more application specific integrated circuits (ASIC), one or more digital signal processors (DSP), one or more field programmable gate arrays (FPGA), or the like. For another example, when one of the foregoing modules is implemented in the form of program code being scheduled by a processing element, the processing element may be a general-purpose processor, such as a central processing unit (CPU) or another processor that can invoke program code. For another example, the modules may be integrated and implemented in a form of a system-on-a-chip (SOC).

Figure 8:
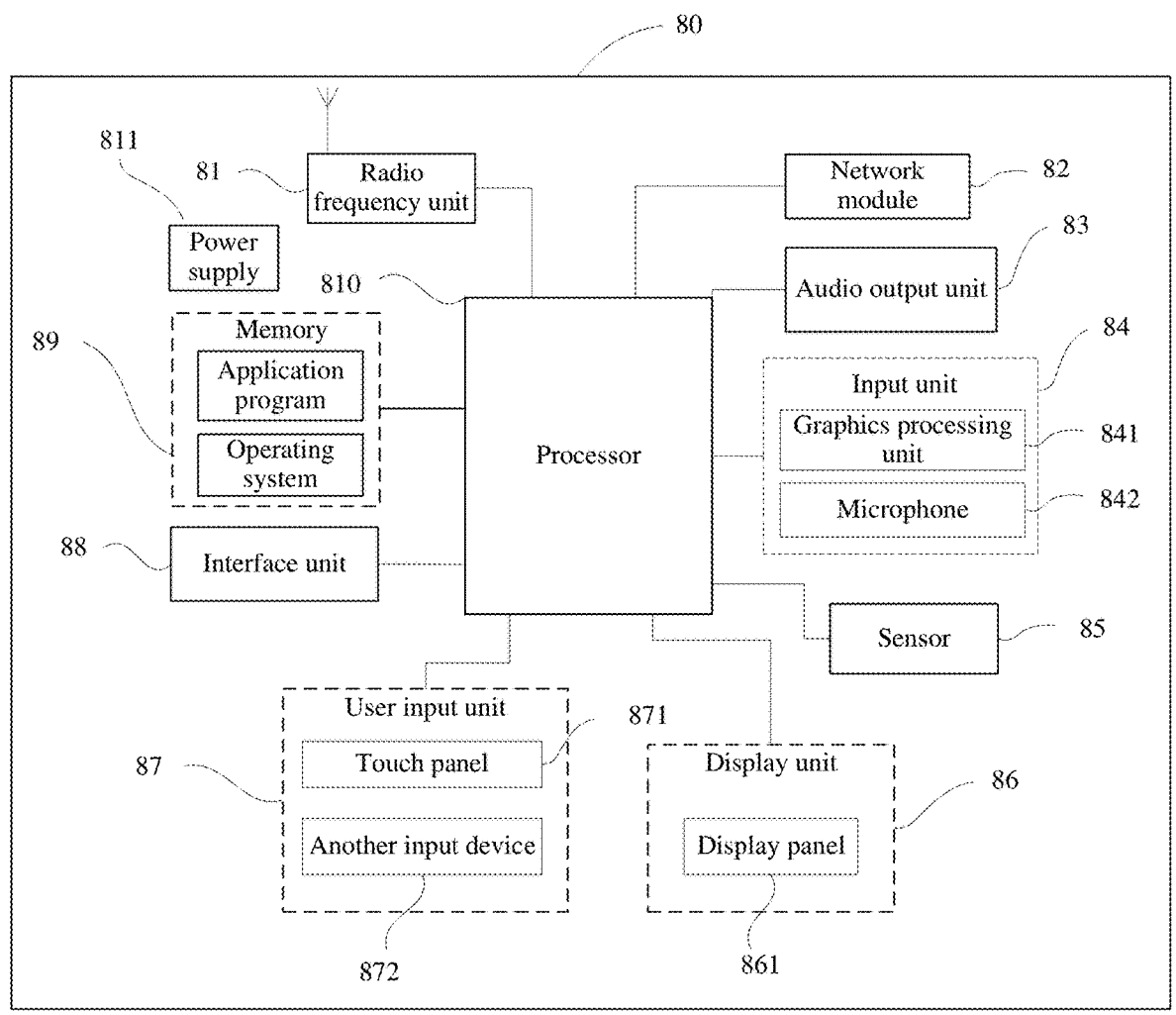
FIG. 8 is a block diagram of a terminal according to an embodiment of the present disclosure.

To better achieve the foregoing objective, optionally, FIG. 8 is a schematic structural diagram of hardware of a terminal for implementing the various embodiments of the present disclosure. The terminal 80 includes, but is not limited to, components such as a radio frequency unit 81, a network module 82, an audio output unit 83, an input unit 84, a sensor 85, a display unit 86, a user input unit 87, an interface unit 88, a memory 89, a processor 810, and a power supply 811. Those skilled in the art may understand that the terminal structure shown in FIG. 8 does not constitute a limitation to the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 81 is configured to send a random access request message through a target carrier; where the target carrier is one of a first type of uplink carrier and a second type of uplink carrier.

The processor 810 is configured to control the radio frequency unit 81 to send and receive data.

The terminal of the embodiments of the present disclosure can select a carrier from the first type of uplink carrier and the second type of uplink carrier, which can increase flexibility of selecting a random access resource. In addition, the terminal further can change a target carrier when random access is not completed. This improves a success rate of random access and reduces a random access delay.

It should be understood that in this embodiment of this disclosure, the radio frequency unit 81 may be configured to receive and send signals in a process of receiving and sending information or calling. For example, the radio frequency unit 81 receives downlink data from a base station for processing by the processor 810, and sends uplink data to the base station. Generally, the radio frequency unit 81 includes but is not limited to an antenna, at least one amplifier, a transceiver, a coupler, a low noise amplifier, a duplexer, and the like. In addition, the radio frequency unit 81 may further communicate with other devices through a wireless communications system and network.

The terminal provides wireless broadband Internet access to a user through the network module 82, for example, helps the user receive and send e-mails, browse web pages, and access streaming media.

The audio output unit 83 may convert, into an audio signal, audio data received by the radio frequency unit 81 or the network module 82 or stored in the memory 89, and output the audio signal as sound. Moreover, the audio output unit 83 may further provide audio output (for example, call signal receiving sound and message receiving sound) related to a specific function performed by the terminal 80. The audio output unit 83 includes a loudspeaker, a buzzer, a receiver, and the like.

The input unit 84 is configured to receive audio or video signals. The input unit 84 may include a graphics processing unit (GPU) 841 and a microphone 842. The graphics processing unit 841 processes image data of a static image or video obtained by an image capture apparatus (such as, a camera) in a video capture mode or an image capture mode. A processed image frame may be displayed on the display unit 86. The image frame processed by the graphics processing unit 841 may be stored in the memory 89 (or another storage medium) or sent through the radio frequency unit 81 or the network module 82. The microphone 842 can receive sound and can process such sound into audio data. The audio data obtained through processing may be converted, in a telephone call mode, into a format that can be sent to a mobile communications base station via the radio frequency unit 81 for output.

The terminal 80 further includes at least one sensor 85, for example, an optical sensor, a motion sensor, and other sensors. For example, the optical sensor includes an ambient optical sensor and a proximity sensor, where the ambient optical sensor can adjust brightness of the display panel 861 according to brightness of ambient light, and the proximity sensor can turn off the display panel 861 and/or backlight when the terminal 80 moves towards the ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 85 may further include a fingerprint sensor, a pressure sensor, an iris sensor, a molecular sensor, a gyroscope, a barometer, a hygrometer, a thermometer, an infrared sensor, and the like. This is not described herein.

The display unit 86 is configured to display information input by a user or information provided to a user. The display unit 86 may include a display panel 861. The display panel 861 may be configured in a form of a liquid crystal display (LCD), an organic light-emitting diode (OLED), or the like.

The user input unit 87 may be configured to receive inputted digit or character information and generate key signal input related to user setting and function control of the terminal. For example, the user input unit 87 includes a touch panel 871 and another input device 872. The touch panel 871 is also referred to as a touchscreen, and may collect a touch operation performed by a user on or near the touch panel 871 (such as an operation performed by a user on the touch panel 871 or near the touch panel 871 by using any proper object or accessory, such as a finger or a stylus). The touch panel 871 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and can receive and execute a command sent by the processor 810. In addition, the touch panel 871 can be implemented by using multiple types such as a resistance type, a capacitance type, infrared rays, and surface acoustic waves. In addition to the touch panel 871, the user input unit 87 may also include the another input device 872. For example, the another input device 872 may include, but is not limited to, a physical keyboard, functional keys (for example, a volume control key and a switch key), a trackball, a mouse, and a joystick. Details are not described herein again.

Optionally, the touch panel 871 may cover the display panel 861. When the touch panel 871 detects a touch operation on or near the touch panel 871, the touch operation is transmitted to the processor 810 to determine a type of a touch event, and then the processor 810 provides corresponding visual output on the display panel 861 according to the type of the touch event. In FIG. 8, the touch panel 871 and the display panel 861 are used as two independent components to implement input and output functions of the terminal. However, in some embodiments, the touch panel 871 and the display panel 861 may be integrated to implement the input and output functions of the terminal. This is not specifically limited herein.

The interface unit 88 is an interface connecting an external apparatus to the terminal 80. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 88 may be configured to receive an input (for example, data information and power) from an external apparatus and transmit the received input to one or more elements within the terminal 80, or may be configured to transmit data between the terminal 80 and the external apparatus.

The memory 89 may be configured to store software programs and various data. The memory 89 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 89 may include a high-speed random access memory, and may also include a non-volatile memory, such as at least one disk storage device, a flash memory device, or other volatile solid-state memory devices.

The processor 810 is a control center of the terminal. The processor 810 uses various interfaces and lines to connect the various parts of the entire terminal, and performs various functions of the terminal and processes data by running or executing software programs and/or modules stored in the memory 89 and invoking data stored in the memory 89, to monitor the terminal as a whole. The processor 810 may include one or more processing units. Optionally, the processor 810 may integrate an application processor and a modem processor. The application processor mainly deals with an operating system, a user interface, an application program, and the like. The modem processor mainly deals with wireless communication. It can be understood that alternatively, the modem processor may not be integrated into the processor 810.

The terminal 80 may further include a power supply 811 (for example, a battery) that supplies power to various components. Optionally, the power supply 811 may be logically connected to the processor 810 by using a power supply management system, to perform functions of managing charging, discharging, and power consumption by using the power supply management system.

In addition, the terminal 80 includes some functional modules not shown. Details are not described herein again.

Optionally, an embodiment of the present disclosure further provides a terminal, including a processor 810, a memory 89, and a computer program that is stored in the memory 89 and executable on the processor 810. When the computer program is executed by the processor 810, each process of the embodiment of the foregoing random access method can be implemented, and a same technical effect can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal is a device such as a personal communication service (PCS) telephone, a cordless telephone, a session initiation protocol (SIP) phone, a wireless local loop (WLL) station, or a PDA. The wireless terminal may also be referred to as a system, a subscriber unit, a subscriber station, a mobile station, a mobile console, a remote station, a remote terminal, an access terminal, a user terminal, a user agent, or a user device (User Device or User Equipment). This is not limited herein.

An embodiment of the present disclosure further provides a non-transitory computer-readable storage medium. A computer program is stored in the non-transitory computer-readable storage medium. When being executed by a processor, the computer program implements each process of the embodiment of the foregoing random access method, and a same technical effect can be achieved. To avoid repetition, details are not described herein. The non-transitory computer-readable storage medium is, for example, a read-only memory (ROM), a random access memory (RAM), a magnetic disk, or an optical disc.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

In addition, it should be noted that in the apparatus and method of the present disclosure, apparently, the components or steps may be divided and/or recombined. These divisions and/or recombinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any of the steps or the components of the methods and the apparatuses of the present disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These divisions and/or recombinations should be considered as equivalent solutions of this disclosure. Moreover, the steps for performing the foregoing series of processing may be performed naturally in chronological order according to a described sequence, but do not necessarily need to be performed in chronological order, and some steps may be performed in parallel or independently.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

What is claimed is:

1. A random access method, applied to a terminal side, comprising:
sending a random access request message through a target carrier; wherein the target carrier is one of a first type of uplink carrier and a second type of uplink carrier; and
before the sending the random access request message through the target carrier, the method further comprises:
in a case where a random access process corresponding to the random access request message is not completed, changing the target carrier if a preset change condition is met; wherein
the changing the target carrier if a preset change condition is met comprises:
in a case where the target carrier is the first type of uplink carrier, if the preset change condition is met, changing the target carrier from the first type of uplink carrier to the second type of uplink carrier; wherein the preset change condition comprises: a counter corresponding to the random access process is equal to a fourth threshold; and
before the changing the target carrier from the first type of uplink carrier to the second type of uplink carrier if the preset change condition is met, the method further comprises at least one of:
after completing an initial selection of the target carrier or completing a previous change of the target carrier, starting a timer corresponding to the random access process; or
after completing an initial selection of the target carrier or completing a previous change of the target carrier, setting the counter corresponding to the random access process; wherein
the counter is configured to record:
times of power ramping in the random access process.

2. The random access method according to claim 1, before the sending the random access request message through the target carrier, further comprising:
obtaining threshold information and channel measurement information; wherein the channel measurement information comprises: at least one of first channel measurement information related to the first type of uplink carrier and second channel measurement information related to the second type of uplink carrier; and
selecting one from the first type of uplink carrier and the second type of uplink carrier as the target carrier according to the threshold information and the channel measurement information.

3. The random access method according to claim 2, wherein the selecting one from the first type of uplink carrier and the second type of uplink carrier as the target carrier according to the threshold information and the channel measurement information comprises:
when the threshold information and the channel measurement information satisfy a first preset condition, determining the second type of uplink carrier as the target carrier; wherein the first preset condition comprises at least one of:
channel quality indicated by quality parameter information of a path loss reference signal of a target downlink carrier is less than a first threshold, wherein the target downlink carrier corresponds to the first type of uplink carrier, or the target downlink carrier corresponds to the second type of uplink carrier;
a parameter item in the first channel measurement information is greater than or equal to a second threshold; or
a parameter item in the second channel measurement information is less than a third threshold.

4. The random access method according to claim 3, wherein the quality parameter information comprises: at least one of reference signal received power (RSRP), reference signal received quality (RSRQ), a received signal strength indicator (RSSI), or a signal to interference plus noise ratio (SINR).

5. The random access method according to claim 3, wherein the parameter item comprises: at least one of reference signal received quality (RSRQ), a received signal strength indicator (RSSI), a channel busy ratio (CBR), or a channel occupancy ratio (CR).

6. The random access method according to claim 1, wherein the preset change condition further comprises at least one of:
- a timer corresponding to the random access process expires;
- a parameter item in the first channel measurement information related to the first type of uplink carrier is greater than or equal to a second threshold; or
- a parameter item in the second channel measurement information related to the second type of uplink carrier is less than a third threshold.

7. The random access method according to claim 6, before the changing the target carrier from the first type of uplink carrier to the second type of uplink carrier if the preset change condition is met, further comprising:
- obtaining threshold information and channel measurement information; wherein the channel measurement information comprises: at least one of the first channel measurement information and the second channel measurement information.

8. The random access method according to claim 1, wherein the counter is configured to further record:
- sending times of the random access request message in the random access process.

9. The random access method according to claim 1, wherein the first type of uplink carrier is a normal uplink (NUL) carrier, and the second type of uplink carrier is a supplement uplink (SUL) carrier.

10. A terminal, wherein the terminal comprises a processor, a memory, and a computer program stored in the memory and executable on the processor, wherein the computer program, when executed by the processor, causes the terminal to perform:
- sending a random access request message through a target carrier; wherein the target carrier is one of a first type of uplink carrier and a second type of uplink carrier; and
- before the terminal performs the sending the random access request message through the target carrier, the computer program, when executed by the processor, causes the terminal to further perform:
- in a case where a random access process corresponding to the random access message is not completed, changing the target carrier if a preset change condition is met; wherein
- in a case where the target carrier is the first type of uplink carrier, if the preset change condition is met, changing the target carrier from the first type of uplink carrier to the second type of uplink carrier; wherein the preset change condition comprises: a counter corresponding to the random access process is equal to a fourth threshold; and
- before the terminal performs the changing the target carrier from the first type of uplink carrier to the second type of uplink carrier if the preset change condition is met, the computer program, when executed by the processor, causes the terminal to further perform at least one of:
- after completing an initial selection of the target carrier or completing a previous change of the target carrier, starting a timer corresponding to the random access process; or
- after completing an initial selection of the target carrier or completing a previous change of the target carrier, setting the counter corresponding to the random access process; wherein
- the counter is configured to record:
- times of power ramping in the random access process.

11. The terminal according to claim 10, before the terminal performs the sending the random access request message through the target carrier, the computer program, when executed by the processor, causes the terminal to further perform:
- obtaining threshold information and channel measurement information; wherein the channel measurement information comprises: at least one of first channel measurement information related to the first type of uplink carrier and second channel measurement information related to the second type of uplink carrier; and
- selecting one from the first type of uplink carrier and the second type of uplink carrier as the target carrier according to the threshold information and the channel measurement information.

12. The terminal according to claim 11, wherein the computer program, when executed by the processor, causes the terminal to perform:
- when the threshold information and the channel measurement information satisfy a first preset condition, determining the second type of uplink carrier as the target carrier; wherein the first preset condition comprises at least one of:
- channel quality indicated by quality parameter information of a path loss reference signal of a target downlink carrier is less than a first threshold, wherein the target downlink carrier corresponds to the first type of uplink carrier, or the target downlink carrier corresponds to the second type of uplink carrier;
- a parameter item in the first channel measurement information is greater than or equal to a second threshold; or
- a parameter item in the second channel measurement information is less than a third threshold.

13. The terminal according to claim 12, wherein the quality parameter information comprises: at least one of reference signal received power (RSRP), reference signal received quality (RSRQ), a received signal strength indicator (RSSI), or a signal to interference plus noise ratio (SINR).

14. The terminal according to claim 12, wherein the parameter item comprises: at least one of reference signal received quality (RSRQ), a received signal strength indicator (RSSI), a channel busy ratio (CBR), or a channel occupancy ratio (CR).

15. The terminal according to claim 10, wherein the preset change condition further comprises at least one of:
- a timer corresponding to the random access process expires;
- a parameter item in the first channel measurement information related to the first type of uplink carrier is greater than or equal to a second threshold; or
- a parameter item in the second channel measurement information related to the second type of uplink carrier is less than a third threshold.

16. The terminal according to claim 15, before the terminal performs the changing the target carrier from the first type of uplink carrier to the second type of uplink carrier if the preset change condition is met, the computer program, when executed by the processor, causes the terminal to further perform:
- obtaining threshold information and channel measurement information; wherein the channel measurement information comprises: at least one of the first channel measurement information and the second channel measurement information.

17. The terminal according to claim 10, wherein the counter is configured to further record:
sending times of the random access request message in the random access process.

18. A non-transitory computer-readable storage medium, wherein the non-transitory computer-readable storage medium stores a computer program, and the computer program, when executed by a processor, causes the processor to perform:
sending a random access request message through a target carrier; wherein the target carrier is one of a first type of uplink carrier and a second type of uplink carrier; and
before the terminal performs the sending the random access request message through the target carrier, the computer program, when executed by the processor, causes the processor to further perform:
in a case where a random access process corresponding to the random access message is not completed, changing the target carrier if a preset change condition is met; wherein
in a case where the target carrier is the first type of uplink carrier, if the preset change condition is met, changing the target carrier from the first type of uplink carrier to the second type of uplink carrier; wherein the preset change condition comprises: a counter corresponding to the random access process is equal to a fourth threshold; and
before the terminal performs the changing the target carrier from the first type of uplink carrier to the second type of uplink carrier if the preset change condition is met, the computer program, when executed by the processor, causes the processor to further perform at least one of:
after completing an initial selection of the target carrier or completing a previous change of the target carrier, starting a timer corresponding to the random access process; or
after completing an initial selection of the target carrier or completing a previous change of the target carrier, setting the counter corresponding to the random access process; wherein
the counter is configured to record:
times of power ramping in the random access process.

19. The non-transitory computer-readable storage medium according to claim 18, before the terminal performs the sending a random access request message through a target carrier, the computer program, when executed by the processor, causes the processor to further perform:
obtaining threshold information and channel measurement information; wherein the channel measurement information comprises: at least one of first channel measurement information related to the first type of uplink carrier and second channel measurement information related to the second type of uplink carrier; and
selecting one from the first type of uplink carrier and the second type of uplink carrier as the target carrier according to the threshold information and the channel measurement information.

20. The non-transitory computer-readable storage medium according to claim 19, wherein the computer program, when executed by the processor, causes the processor to perform:
when the threshold information and the channel measurement information satisfy a first preset condition, determining the second type of uplink carrier as the target carrier; wherein the first preset condition comprises at least one of:
channel quality indicated by quality parameter information of a path loss reference signal of a target downlink carrier is less than a first threshold, wherein the target downlink carrier corresponds to the first type of uplink carrier, or the target downlink carrier corresponds to the second type of uplink carrier;
a parameter item in the first channel measurement information is greater than or equal to a second threshold; or
a parameter item in the second channel measurement information is less than a third threshold.

* * * * *